United States Patent
Kim et al.

(10) Patent No.: US 9,544,479 B2
(45) Date of Patent: Jan. 10, 2017

(54) CAMERA MODULE

(71) Applicant: SAMSUNG ELECTRO-MECHANICS CO., LTD., Suwon-Si (KR)

(72) Inventors: Po Chul Kim, Suwon-Si (KR); Yoo Chang Kim, Suwon-Si (KR); Jung Seok Lee, Suwon-Si (KR); Sung Hoon Kim, Suwon-Si (KR); Man Su Kim, Suwon-Si (KR); Jae Ho Baik, Suwon-Si (KR); Kyeong Jun Kim, Suwon-Si (KR); Myung Ki Lee, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/642,803

(22) Filed: Mar. 10, 2015

(65) Prior Publication Data
US 2016/0142595 A1 May 19, 2016

(30) Foreign Application Priority Data
Nov. 13, 2014 (KR) .......................... 10-2014-0158349

(51) Int. Cl.
*H04N 5/225* (2006.01)

(52) U.S. Cl.
CPC .......... *H04N 5/2252* (2013.01); *H04N 5/2254* (2013.01); *H04N 5/2257* (2013.01)

(58) Field of Classification Search
CPC ................................................... H04N 5/2252
See application file for complete search history.

(56) References Cited

U.S. PATENT DOCUMENTS

| | | | |
|---|---|---|---|
| 7,706,089 B2 * | 4/2010 | Koc ...................... | G02B 7/021 359/819 |
| 7,995,297 B2 * | 8/2011 | Chou ...................... | G02B 7/08 310/311 |
| 8,842,355 B2 * | 9/2014 | Lipton ..................... | G02B 7/08 359/233 |
| 2008/0192124 A1 * | 8/2008 | Nagasaki ................ | G02B 7/02 348/208.11 |
| 2008/0231974 A1 * | 9/2008 | Jung ........................ | G02B 7/08 359/824 |
| 2009/0303594 A1 | 12/2009 | Lim et al. | |
| 2011/0026915 A1 | 2/2011 | Baik et al. | |

FOREIGN PATENT DOCUMENTS

| | | |
|---|---|---|
| KR | 10-2009-0021698 A | 3/2009 |
| KR | 10-2009-0127628 A | 12/2009 |
| KR | 10-2011-0011192 A | 2/2011 |

\* cited by examiner

*Primary Examiner* — James Hannett
(74) *Attorney, Agent, or Firm* — NSIP Law (57) ABSTRACT

A camera module includes a housing having a guide groove formed therein, the guide groove being extended lengthwise in an optical axis direction, a lens barrel mounted in the housing and having a guide protrusion inserted into the guide groove, and an elastic member disposed on the guide groove so that the guide protrusion may be prevented from being separated from the guide groove.

15 Claims, 9 Drawing Sheets

CAMERA MODULE

CROSS-REFERENCE TO RELATED APPLICATION

This application claims the priority and benefit of Korean Patent Application No. 10-2014-0158349 filed on Nov. 13, 2014, with the Korean Intellectual Property Office, the disclosure of which is incorporated herein by reference.

BACKGROUND

The present disclosure relates to a camera module provided in a mobile terminal.

Camera modules commonly have an auto-focusing function. In addition, camera modules also have an optical image stabilization (OIS) function in order to decrease a resolution reduction phenomenon due to hand-shake.

Camera modules having the above-mentioned functions have a structure in which a lens unit may move in an optical axis direction or in a direction perpendicular to that of an optical axis with respect to a housing of the camera module.

However, in such a structure, the lens unit may easily collide with the housing of the camera module due to external impacts. Therefore, a structure for decreasing damage or noise due to external impacts is required.

For reference, Patent Document 1 discloses a camera module as the related art.

RELATED ART DOCUMENT (Patent Document 1) KR2011-0011192 A

SUMMARY

An aspect of the present disclosure may provide a lens module having a structure resistant to external impacts.

According to an aspect of the present disclosure, a camera module may have a structure in which collisions between a lens barrel and a housing are avoided or decreased.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1:
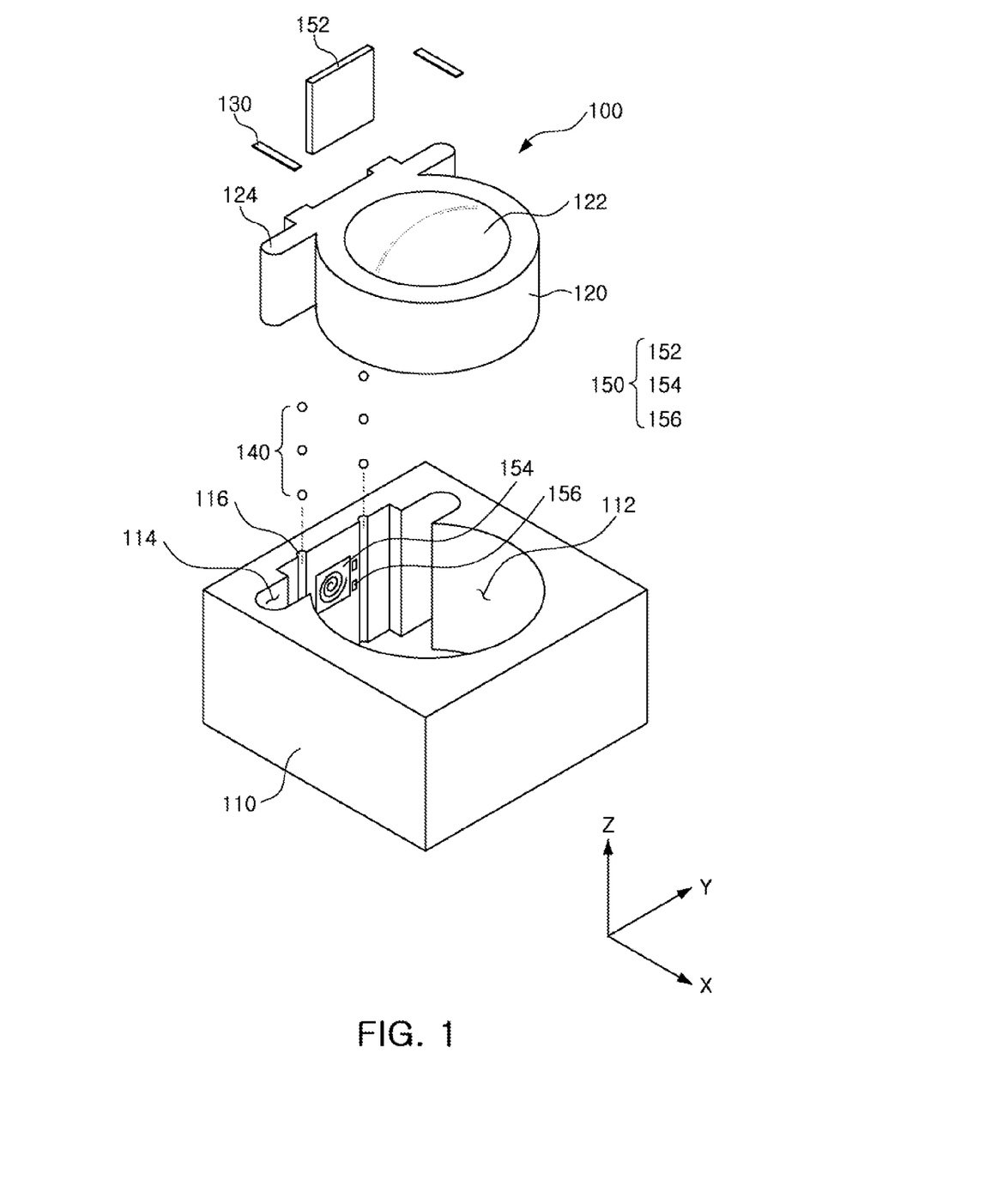
FIG. 1 is an exploded perspective view of a camera module according to an exemplary embodiment of the present disclosure.

A camera module according to an exemplary embodiment of the present disclosure will be described with reference to FIG. 1.

A camera module 100 may include a housing 110, a lens barrel 120, and an elastic member 130. As an example, the camera module 100 may have a form in which the housing 110, the lens barrel 120, and the elastic member 130 are coupled to each other. In addition, the camera module 100 may further include an actuator 150 configured to move the lens barrel 120. As an example, the housing 110 and the lens barrel 120 may be mounted with one or more actuators 150 providing driving force required for moving the lens barrel 120. In addition, the camera module 100 may further include a plurality of rolling members 140 enabling smooth movement of the lens barrel 120. As an example, the plurality of rolling member 140 decreasing friction due to a contact between the housing 110 and the lens barrel 120 may be disposed between the housing 110 and the lens barrel 120.

Next, components configuring the camera module 100 will be described with reference to FIG. 1.

The housing 110 may be configured to accommodate the lens barrel 120 therein. For example, the housing 110 may have a lens barrel accommodating part 112 formed therein, wherein the lens barrel accommodating part 112 has a size enough to accommodate the lens barrel 120 therein. The lens barrel accommodating part 112 may have a form that is substantially the same as or similar to that of the lens barrel 120. As an example, a cross-sectional shape of the lens barrel accommodating part 112 may be similar to that of the lens barrel 120. The lens barrel accommodating part 112 may have one or more guide grooves 114 formed therein. As an example, a pair of guide grooves 114 having a form in which they face each other may be formed at one side of the lens barrel accommodating part 112. The guide groove 114 may be extended lengthwise in a height direction (Z axis direction based on FIG. 1) of the housing 110. The guide groove 114 formed as described above may serve to help the lens barrel 120 to stably move in an optical axis direction. In addition, the lens barrel accommodating part 112 may have a plurality grooves 116 formed therein. As an example, a pair of grooves 116 may be formed at one side of the lens barrel accommodating part 112 to be spaced apart from each other by a predetermined interval. The grooves 116 formed as described above may be used as spaces in which the rolling members 140 are to be mounted.

The lens barrel 120 may be coupled to the housing 110. As an example, the lens barrel 120 may be mounted in the lens barrel accommodating part 112 of the housing 110. The lens barrel 120 may include a lens required for photographing a subject. As an example, the lens barrel 120 may include a lens unit 122 including one or more lenses. The lens barrel 120 may be configured to be movable in one direction with respect to the housing 110. As an example, the lens barrel 120 may vertically move in the height direction of the housing 110 in a state in which it is mounted in the lens barrel accommodating part 112. The lens barrel 120 may include a pair of guide protrusions 124 enabling stable movement of the lens barrel 120 with respect to the housing 110. As an example, the pair of guide protrusions 124 may be fitted into the guide grooves 114 of the housing 110, respectively, to induce the lens barrel 120 to move in only a length direction of the guide grooves 114.

The elastic member 130 may be formed on the housing 110. As an example, a pair of elastic members 130 may be formed to partially cover the guide grooves 114. The elastic member 130 may substantially have a plate form. As an example, the elastic member 130 may be manufactured in leaf spring form. The elastic member 130 may be formed of a material that may be easily elastically deformed by external impact. As an example, the elastic member 130 may be formed of a metal material having a predetermined elasticity modulus. The elastic member 130 may be configured to block the lens barrel 120 from being separated from the housing 110. As an example, the elastic member 130 may contact the guide protrusion 124 in order for the guide protrusion 124 not to escape from the guide groove 114.

The rolling members 140 may be configured to significantly decrease friction due to a contact between the housing 110 and the lens barrel 120. As an example, the rolling members 140 may be fitted into the grooves 116 of the housing 110 to significantly decrease a contact area between the housing 110 and the lens barrel 120. The rolling members 140 may be manufactured in a form in which they point-contact the housing 110 and the lens barrel 120. For example, the rolling member 140 may have a spherical form. However, a form of the rolling member 140 is not limited to the spherical form. As another exemplary the rolling members 140 may have a form in which they line-contact the housing 110 and the lens barrel 120. The rolling member 140 may be coated with a lubricant having a predetermined viscosity. As an example, the lubricant may be injected into the grooves 116 of the housing 110 in order to smooth rolling movement of the rolling members 140 and decrease friction and noise due to the rolling movement of the rolling members 140.

The actuator 150 may be configured to enable the movement of the lens barrel 120. As an example, the actuator 150 may generate driving force that may move the lens barrel 120. To this ends, the actuator 150 may include a permanent magnet 152 and a coil 154. As an example, the permanent magnet 152 may be mounted in the lens barrel 120, and the coil 154 may be formed in the housing 110. The actuator 150 configured as described above may freely move the lens barrel 120 in the optical axis direction (Z axis direction based on FIG. 1) by changing a direction and a magnitude of magnetic force formed in the permanent magnet 152 and the coil 154. The actuator 150 may include sensors 156 in order to precisely move the lens barrel 120. As an example, the sensors 156 may be mounted at one side of the coil 154. The sensors 156 may sense a change in a magnetic flux density formed between the permanent magnet 152 and the coil 154. The actuator 150 may be configured to receive the change in the magnetic flux density sensed by the sensors 156 and decide a position of the lens barrel 120 through the change in the magnetic flux density.

An assembled form of the camera module will be described with reference to FIG. 2.

Figure 2:
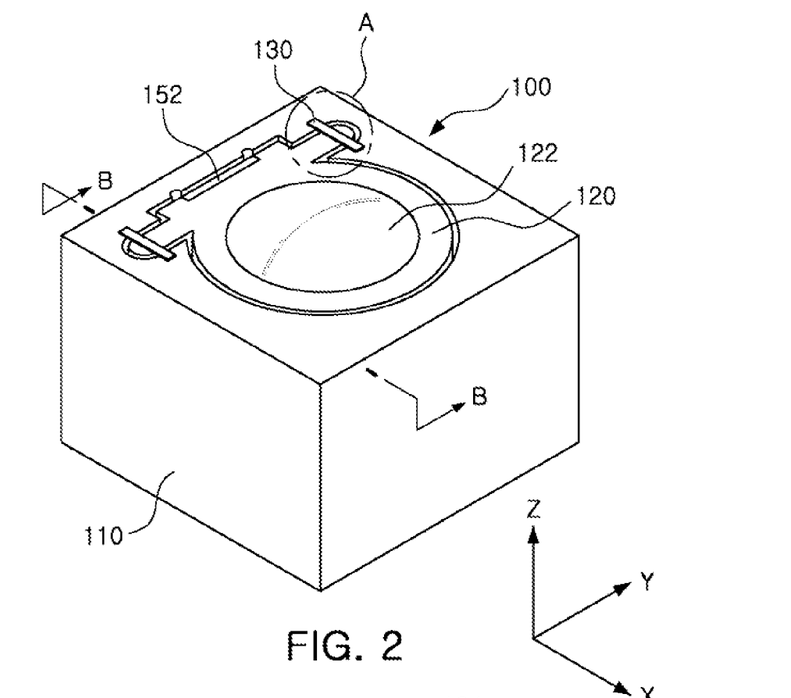
FIG. 2 is an assembled perspective view of the camera module shown in FIG. 1.

Components of the camera module 100 may be integrated with each other in a form of one small module, as shown in FIG. 2. Therefore, the camera module 100 may be easily mounted in a small electronic device, a mobile terminal, or the like.

The camera module 100 may be configured to decrease separation of and damage to the lens barrel 120. As an example, the elastic members 130 may be disposed to contact the guide protrusions of the lens barrel 120 to prevent the separation of the lens barrel 120 and prevent collision between the lens barrel 120 and another component (for example, a shield can (not shown)).

Figure 3:
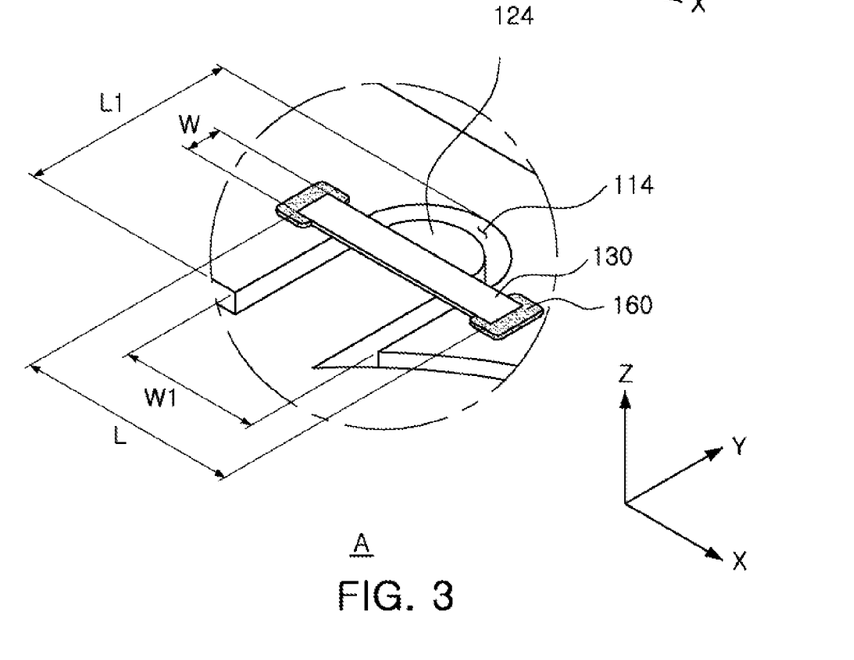
FIG. 3 is an enlarged view of part A shown in FIG. 2.

Next, a form in which the elastic member 130 is disposed will be described in detail with reference to FIG. 3.

The elastic member 130 may be disposed that is substantially in a width direction of the guide groove 114. As an example, the elastic member 130 may be extended lengthwise in the width direction of the guide groove 114. In addition, a length L of the elastic member 130 may be larger than a width W1 of the guide groove 114. The elastic member 130 may be configured to partially cover the guide groove 114. As an example, a width W of the elastic member 130 may be smaller than a length L1 of the guide groove 114. The elastic member 130 may be fixed to the housing 110. As an example, both ends of the elastic member 130 may be firmly fixed to the housing 110 by adhesion members 160.

The elastic member 130 configured as described above may block the guide protrusion 124 of the lens barrel 120 from being separated from the guide groove 114 of the housing 110 and prevent collision between the guide protrusion 124 of the lens barrel 120 and another member.

Figure 4:
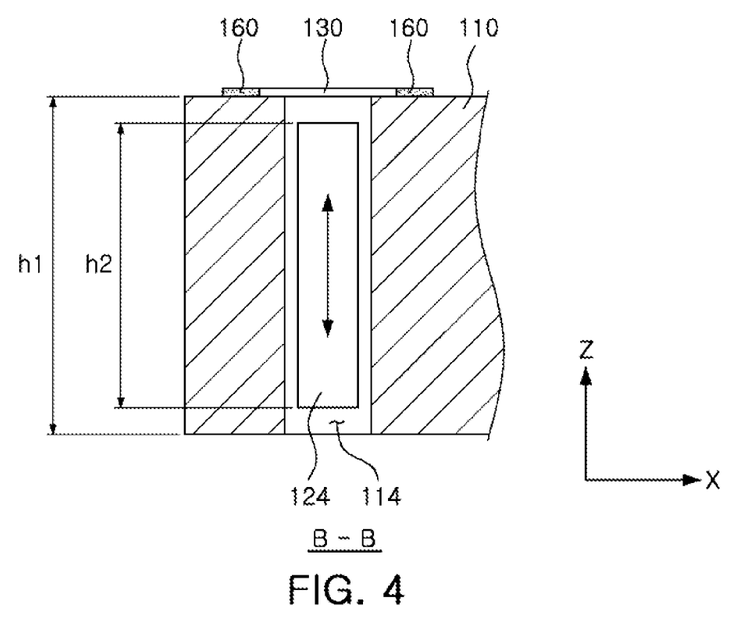
FIG. 4 is a cross-sectional view of the camera module taken along line B-B of FIG. 2.

Next, a form of a cross section of the camera module 100 taken along line B-B will be described with reference to FIG. 4.

The camera module 100 may be configured so that the lens barrel 120 may move in the housing 110. As an example, a depth h1 of the guide groove 114 in the housing 110 may be larger than a height of the lens barrel 120 or a height h2 of the guide protrusion 124. Therefore, the lens barrel 120 may freely move in the optical axis direction (Z axis direction based on FIG. 4) in a range of a height deviation (h1-h2).

The elastic member 130 may be formed at one side of the guide groove 114. As an example, the elastic member 130 may be disposed above the guide groove 114 to limit a movement range of the guide protrusion 124. Meanwhile, although the case in which the elastic member 130 is disposed only above the guide groove 114 has been shown in FIG. 4, the elastic member 130 may also be disposed below the guide groove 114. In addition, although the housing 110 having a form in which both of upper and lower portions of the guide groove 114 are opened has been shown in FIG. 4, the lower portion of the guide groove 114 may be closed, if necessary.

Figure 5:
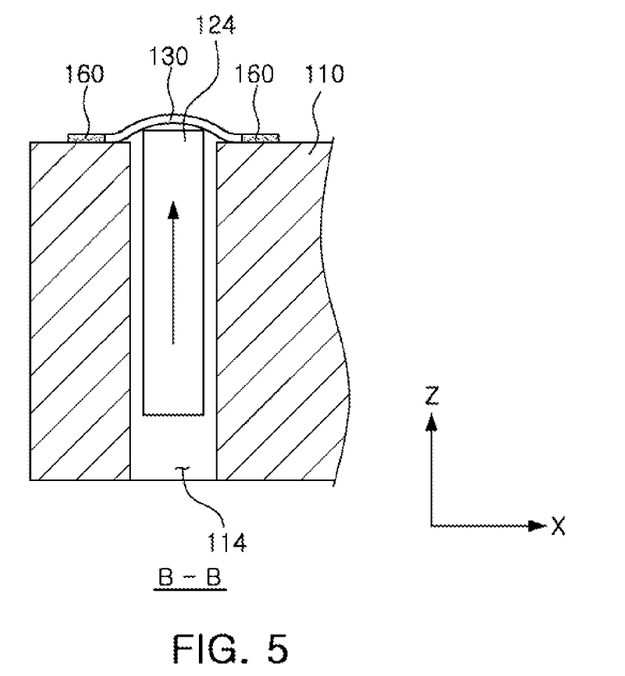
FIG. 5 is a cross-sectional view of the camera module taken along line B-B in a state in which a lens barrel and an elastic member collide with each other.

A function of the elastic member will be described with reference to FIG. 5.

The camera module 100 may be configured to decrease damage and noise due to rapid movement of the lens barrel 120. As an example, the elastic member 130 disposed on the housing 110 may limit a movement range of the lens barrel 120 to decrease collision and collision sound between the lens barrel 120 and another component. For example, the elastic member 130 may be configured be preferentially contacted by the guide protrusion 124 of the lens barrel 120 to block collision between the guide protrusion 124 and another component. In addition, the elastic member 130 may be used to elastically change impact applied by the guide protrusion 124, thereby decreasing impact and noise caused by collision with the guide protrusion 124.

Therefore, with the camera module 100 according to the present exemplary embodiment, noise and damage problems that occurred since the lens barrel 120 is shaken in the optical axis direction may be decreased.

Next, several forms of an elastic member will be described.

Figure 6:
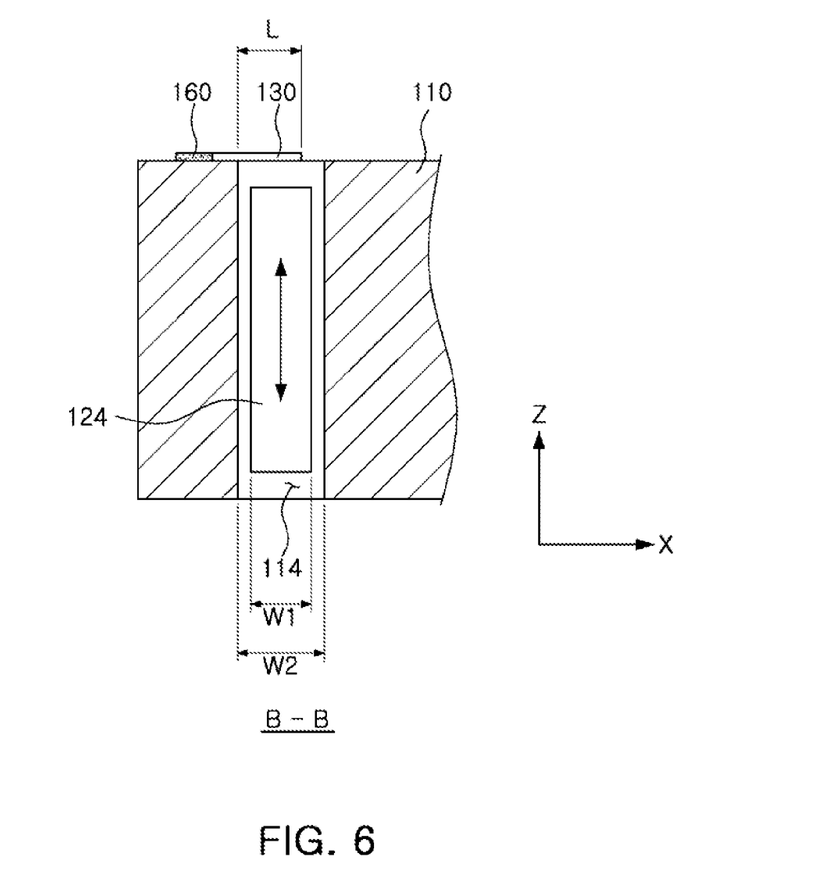
FIG. 6 is a cross-sectional view of a camera module including another form of an elastic member, taken along line B-B.

First, another form of an elastic member will be described with reference to FIG. 6.

An elastic member 130 according to another form may be different in a disposition form thereof from the elastic member 130 described above. For example, the elastic member 130 may be disposed so that one end thereof freely moves. In detail, one end of the elastic member 130 may be fixed to the housing 110 and the other end thereof may be disposed on the guide groove 114.

The elastic member 130 may be disposed to contact the guide protrusion 124. As an example, a length L of the elastic member 130 extended to the guide groove 114 may be larger than a width W1 of the guide protrusion 124 and be smaller than a width W2 of the guide groove 114.

The elastic member 130 having this form may be advantageous in effectively decreasing impact energy transferred by the guide protrusion 124 since an elastic deformation width of one end thereof extended to the guide groove 114 is significantly large.

Figure 7:
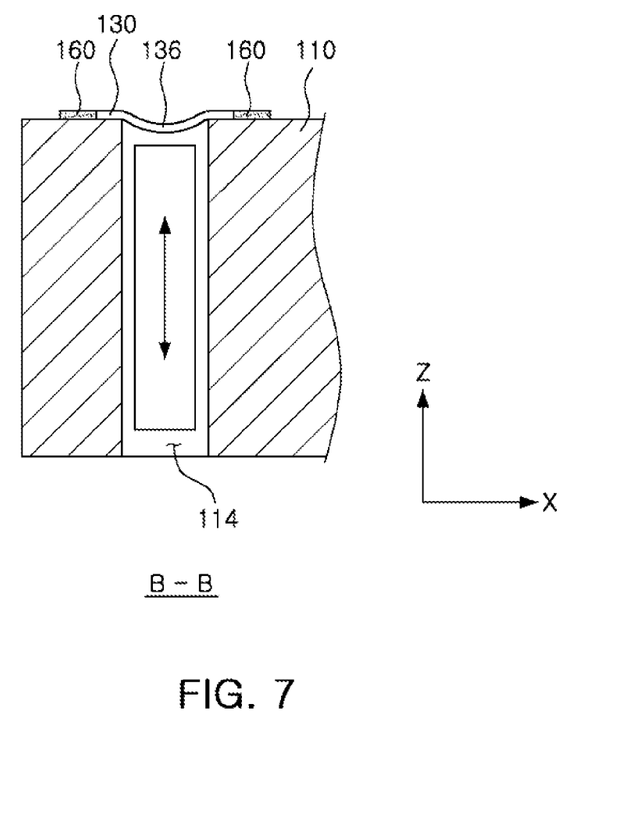
FIG. 7 is a cross-sectional view of a camera module including another form of an elastic member, taken along line B-B.

Next, another form of an elastic member will be described with reference to FIG. 7.

An elastic member 130 according to another form may be different from the elastic member 130 described above in that a curved portion 136 is formed. As an example, the curved portion 136 convexly protruding toward the guide protrusion 124 may be formed in the elastic member 130.

The elastic member 130 having this form may effectively decrease larger impact and impact sound since larger elastic deformation in the curved portion 136 may be expected.

Next, several coupling forms between a housing and an elastic member will be described.

Figure 8:
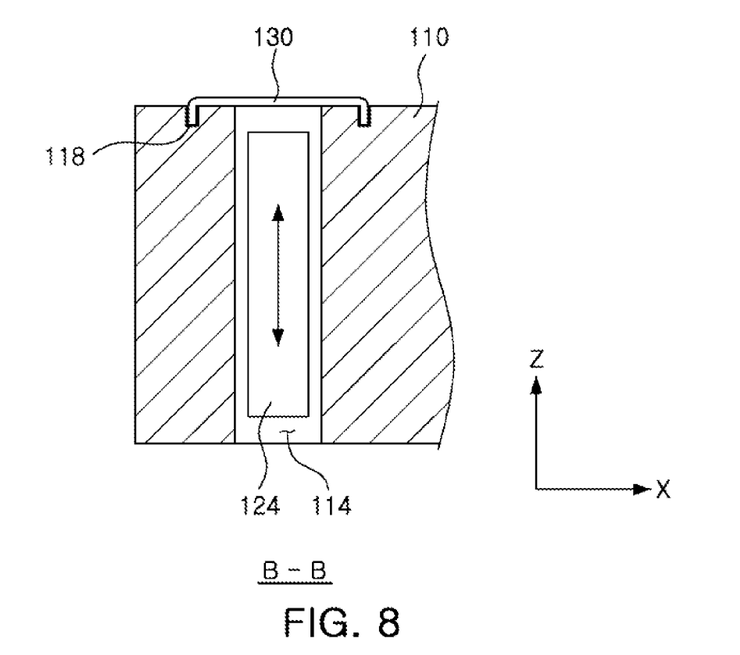
FIG. 8 is a cross-sectional view of a camera module including another form of an elastic member, taken along line B-B.

First, another coupling form between a housing and an elastic member will be described with reference to FIG. 8.

The elastic member 130 may be configured to be coupled to the housing 110. For example, both ends of the elastic member 130 may be fitted into grooves 118 formed in one side of the housing 110. The grooves 118 may be configured so that both ends of the elastic member 130 are firmly fitted thereinto. As an example, both ends of the elastic member 130 may be press-fitted into the grooves 118 to thereby be firmly fixed thereto. In addition, an adhesive may be filled in the grooves 118 in order to more firmly couple between the housing 110 and the elastic member 130.

The above-mentioned coupling form may be advantageous in improving mechanical coupling strength between the elastic member 130 and the housing 110.

Figure 9:
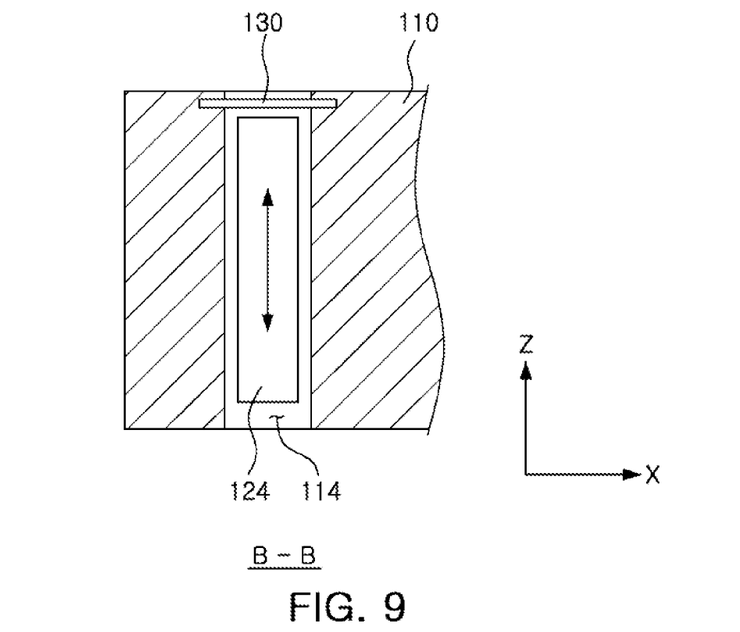
FIG. 9 is a cross-sectional view of a camera module including another form of an elastic member, taken along line B-B.

Next, another coupling form between a housing and an elastic member will be described with reference to FIG. 9.

The elastic member 130 may be formed integrally with the housing 110. For example, the elastic member 130 may be formed integrally with the housing 110 in an insert injection molding or double injection molding scheme.

The above-mentioned coupling form may completely prevent a phenomenon that the elastic member 130 is separated from the housing 110 due to collision with the lens barrel 120 since the elastic member 130 is firmly fixed in the housing 110.

Figure 10:
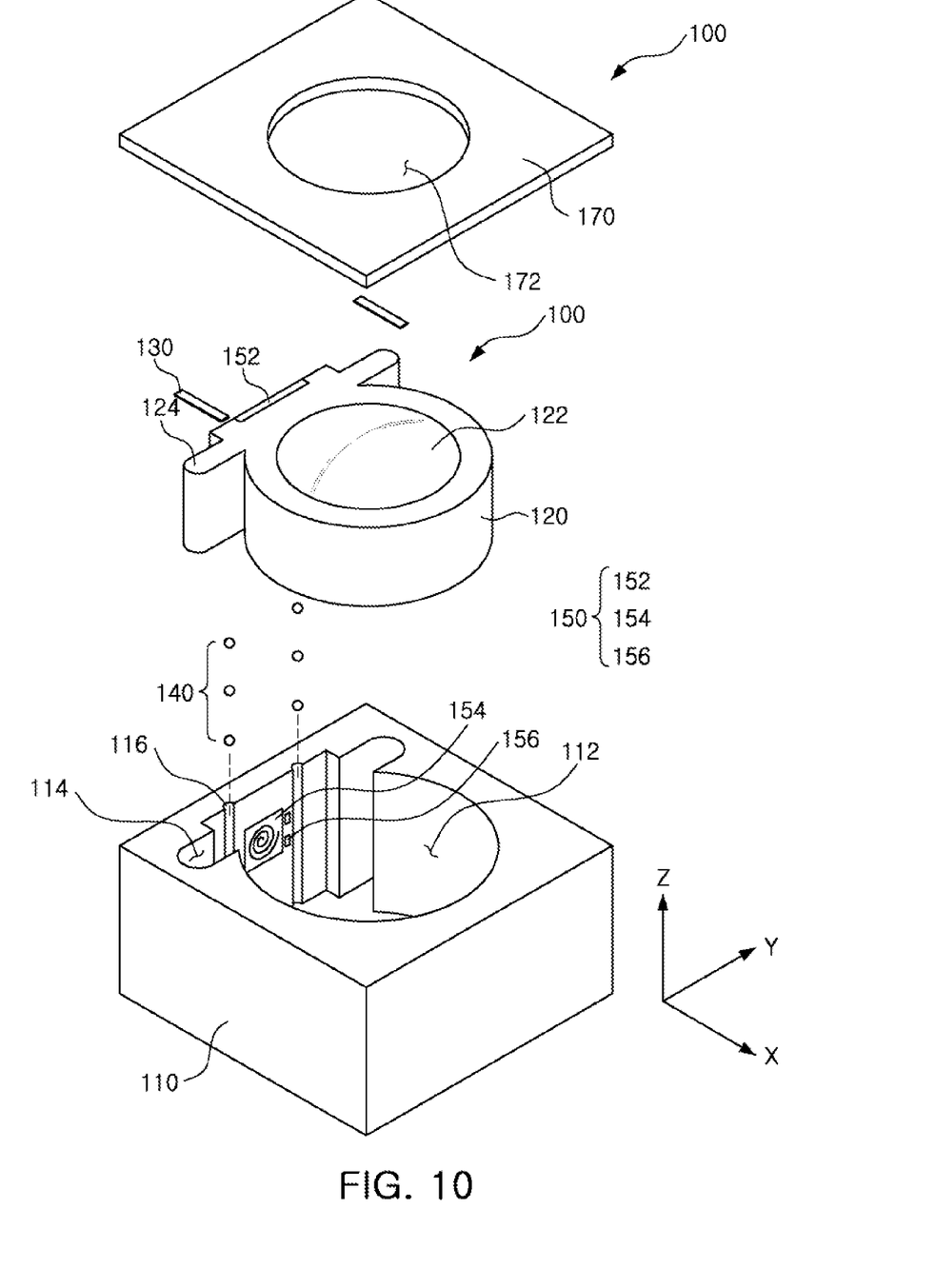
FIG. 10 is an exploded perspective view of a camera module according to another exemplary embodiment of the present disclosure.

A camera module according to another exemplary embodiment of the present disclosure will be described with reference to FIG. 10. For reference, in the following description for another exemplary embodiment, components that are the same as those of the camera module according to the above-mentioned exemplary embodiment will be denoted by the same reference numerals and a description therefor will be omitted.

The camera module 100 according to the present exemplary embodiment may be different from the camera module according to an exemplary embodiment of the present disclosure described above in that it further includes a cover member 170. As an example, the cover member 170 for preventing separation of the lens barrel 120 may be mounted on the housing 110. The cover member 170 may have a hole 172 formed therein in order to expose the lens unit 122.

In addition, the camera module 100 according to the present exemplary embodiment may be different in a position of the elastic member 130 from the camera module according to an exemplary embodiment of the present disclosure. This will be again described with reference to FIG. 12.

Figure 11:
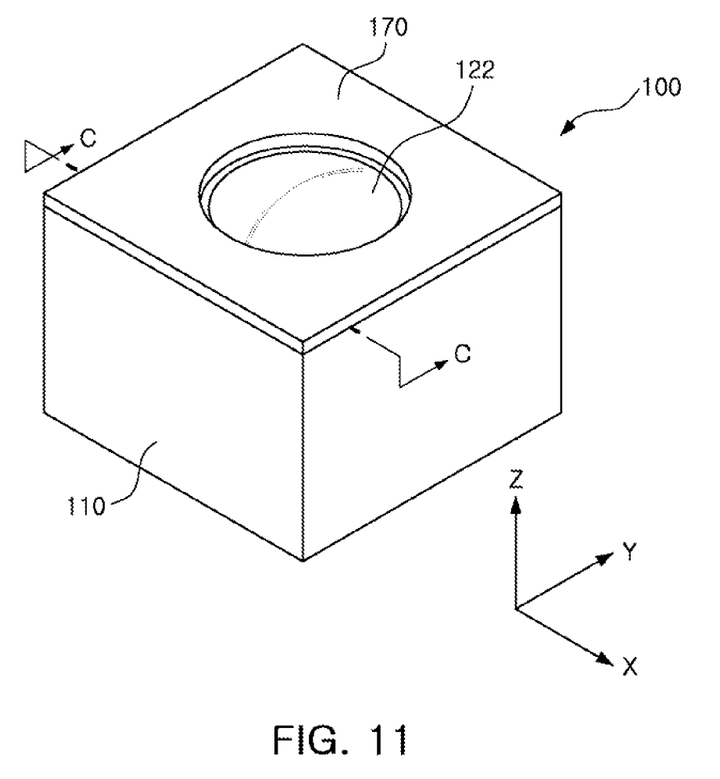
FIG. 11 is an assembled perspective view of the camera module shown in FIG. 10.

An assembled form of the camera module will be described with reference to FIG. 11.

The camera module 100 according to the present exemplary embodiment may have a form in which the lens barrel 120 is firmly protected by the housing 110 and the cover member 170. Therefore, the camera module 100 according to the present exemplary embodiment may be advantageous in protecting the lens barrel 120 and the actuator 160 from external impact.

Figure 12:
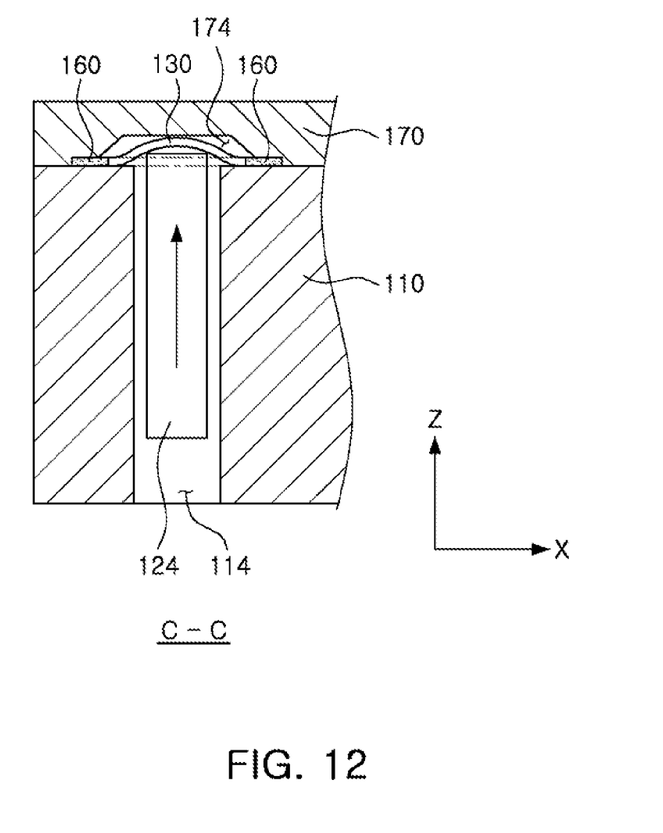
FIG. 12 is a cross-sectional view of the camera module taken along line C-C of FIG. 11.

A cross-sectional structure of a portion at which the elastic member is disposed will be described with reference to FIG. 12.

The camera module 100 according to the present exemplary embodiment may be different in a disposition of the elastic member 130 from the camera module according to an exemplary embodiment of the present disclosure. As an example, the elastic member 130 may be attached to the cover member 170.

In addition, the cover member 170 may have a groove 174 formed therein in order to enable elastic deformation of the elastic member 130. The groove 174 may be disposed to face the guide groove 114 and may also be used as a space accommodating rapid movement of the guide protrusion 124.

The elastic member 130 may be coupled to the cover member 170 by the adhesion members 160. However, a scheme in which the elastic member 130 and the cover member 170 are coupled to each other is not limited to an adhesion scheme. As an example, the elastic member 130 may be coupled to the cover member 170 in a fitting scheme, an insert injection molding scheme, or the like, shown in FIGS. 8 and 9.

As set forth above, according to exemplary embodiments of the present disclosure, a defect and a noise generation phenomenon of the camera module due to collision between the lens barrel and the housing may be decreased.

While exemplary embodiments have been shown and described above, it will be apparent to those skilled in the art that modifications and variations could be made without departing from the scope of the present invention as defined by the appended claims.

What is claimed is:

1. A camera module comprising:
   a housing having a guide groove formed therein, the guide groove being extended in an optical axis direction;
   a lens barrel mounted in the housing and having a guide protrusion inserted into the guide groove; and
   an elastic member disposed on the guide groove,
   wherein the guide protrusion is configured to be movable along the guide groove, and
   wherein the elastic member is configured to be elastically deformed by collision with the guide protrusion.

2. The camera module of claim 1, wherein the elastic member is disposed in a width direction of the guide groove.

3. The camera module of claim 1, wherein one end of the elastic member is a fixed end fixed to the housing and the other end of the elastic member is a movable end disposed on the guide groove.

4. The camera module of claim 1, wherein the elastic member includes one or more curved portions protruding toward the guide protrusion.

5. The camera module of claim 1, wherein the elastic member is configured in a leaf spring form.

6. The camera module of claim 1, wherein the housing is configured to accommodate a portion of the elastic member therein so that the elastic member is fixed to the housing.

7. The camera module of claim 1, wherein both ends of the elastic member are fitted into grooves formed in the housing.

8. The camera module of claim 1, further comprising one or more rolling members disposed between the housing and the lens barrel.

9. The camera module of claim 1, further comprising an actuator configured to move the lens barrel in the optical axis direction.

10. The camera module of claim 9, wherein the actuator includes:
    a permanent magnet disposed in the lens barrel;
    a coil disposed in the housing; and
    a sensor disposed on the housing and sensing a position of the lens barrel.

11. A camera module comprising:
    a lens barrel having a guide protrusion formed thereon, the guide protrusion being inserted into a housing;
    a cover member coupled to the housing and configured to prevent the lens barrel from being separated from the housing; and
    an elastic member disposed between the housing and the cover member and configured to be elastically deformed by collision with the guide protrusion,
    wherein both ends of the elastic member are fixed to the housing or the cover member.

12. The camera module of claim 11, wherein the housing has a guide groove formed therein and the guide protrusion is inserted into the guide groove.

13. A camera module comprising:
    a lens barrel having a pair of guide protrusion formed thereon, the pair of guide protrusions being inserted into a housing;
    a cover member coupled to the housing and configured to prevent the lens barrel from being separated from the housing; and
    an elastic member disposed between the housing and the cover member and configured to contact the guide protrusion in the vicinity of the cover member,
    wherein the housing has a guide groove formed therein and the guide protrusions are inserted into the guide groove, and
    wherein the cover member has a groove formed therein, the groove facing the guide groove and being configured to accommodate an elastically deformed portion of the elastic member therein.

14. The camera module of claim 11, wherein the elastic member is formed integrally with the cover member.

15. The camera module of claim 11, wherein the elastic member includes one or more curved portions protruding toward the guide protrusion.

* * * * *